Martin A. Rafferty
Thomas F. Leahey     Inventors

By Richard W. Nagel     Attorney

United States Patent Office 3,070,360
Patented Dec. 25, 1962

3,070,360
SELF-REFLUXING FRACTIONATION TRAY
Martin A. Rafferty, Linden, and Thomas F. Leahey, Roselle Park, N.J., assignors to Esso Research and Engineering Company, a corporation of Delaware
Filed Oct. 7, 1958, Ser. No. 765,818
2 Claims. (Cl. 261—113)

The present invention relates to an improved apparatus for countercurrently contacting vapors and liquids. More particularly, the present invention relates to an improved fractionation zone and contacting tray involving a novel self-refluxing principle and dispensing with the necessity of downcomers. Still more particularly, the present invention relates to a fractionation tray having substantially increased capacity and efficiency over those presently available. In accordance with the present invention, a portion of the tray liquid is recycled by entraining it into the rising vapors from a lower tray by means described in detail below. In further accordance with the present invention, there is provided a tray of high mechanical strength and low fabrication cost which provides at least one and one-half times the liquid and vapor capacities with half the pressure drop of any current commercially operable devices.

It is well known to carry out many reactions and separations wherein vapors and liquids are contacted in a countercurrent manner, such as in a hydrocarbon fractionation or asphalt oxidation zone. Normally, the liquid passes from one zone to a lower zone by means of downcomers or their equivalents while the vapors pass upwardly from zone to zone through chimneys in the train, around various types of bell caps into the liquid phase disposed on the top of the tray. The liquid phase passes from zone to zone over weirs on the respective trays into downcomers and passes onto the tray in the zone below. In this arrangement vapor is simply bubbled through liquid and the tray efficiency is limited by this basic method.

More recently downcomerless trays have been employed more widely, for instance the sieve tray and the like. These have a distinct economic advantage in that the entire volume of the tower is available for contacting. However, these too in essence simply bubble upflowing vapor through liquid and have not proved too satisfactory in either efficiency or capacity. Also, since in these types of downcomerless trays, the vapor and liquid share a common path, i.e. the perforations alternately permit liquid then vapor flow, the range of stable operation of these downcomerless trays is limited. Slight irregularity or curvature in the tray surface to, in a sense, effect peaks and valleys, cannot alter the random flow of the liquid and vapor through the perforations. The establishment of such separate, stable paths for liquid and vapor is one of the important objects of the present invention.

It is a further important object of the present invention to provide an improved type liquid-vapor contact device for a fractionating column or the like in which the velocity of the rising vapors is effectively utilized to improve the contact between vapor and liquid so that a more efficient fractionation results.

A further object of the present invention is to provide a fractionation column or the like with a liquid-vapor contacting device by means of which rising vapor entrains recycled liquid at high velocity to cause the liquid on each deck or plate to form a highly comminuted spray so that intimate mixing of the vapors with the liquid and a thorough circulation of the liquid in each plate are obtained.

It is a still further object of the present invention to provide a tray of high mechanical strength and low fabrication cost and of great mechanical simplicity adapted to carry out this self-refluxing principle.

Further objects and advantages of the present invention will appear from the following description of a preferred embodiment thereof taken in conjunction with the attached drawing, wherein.

Figure 1:
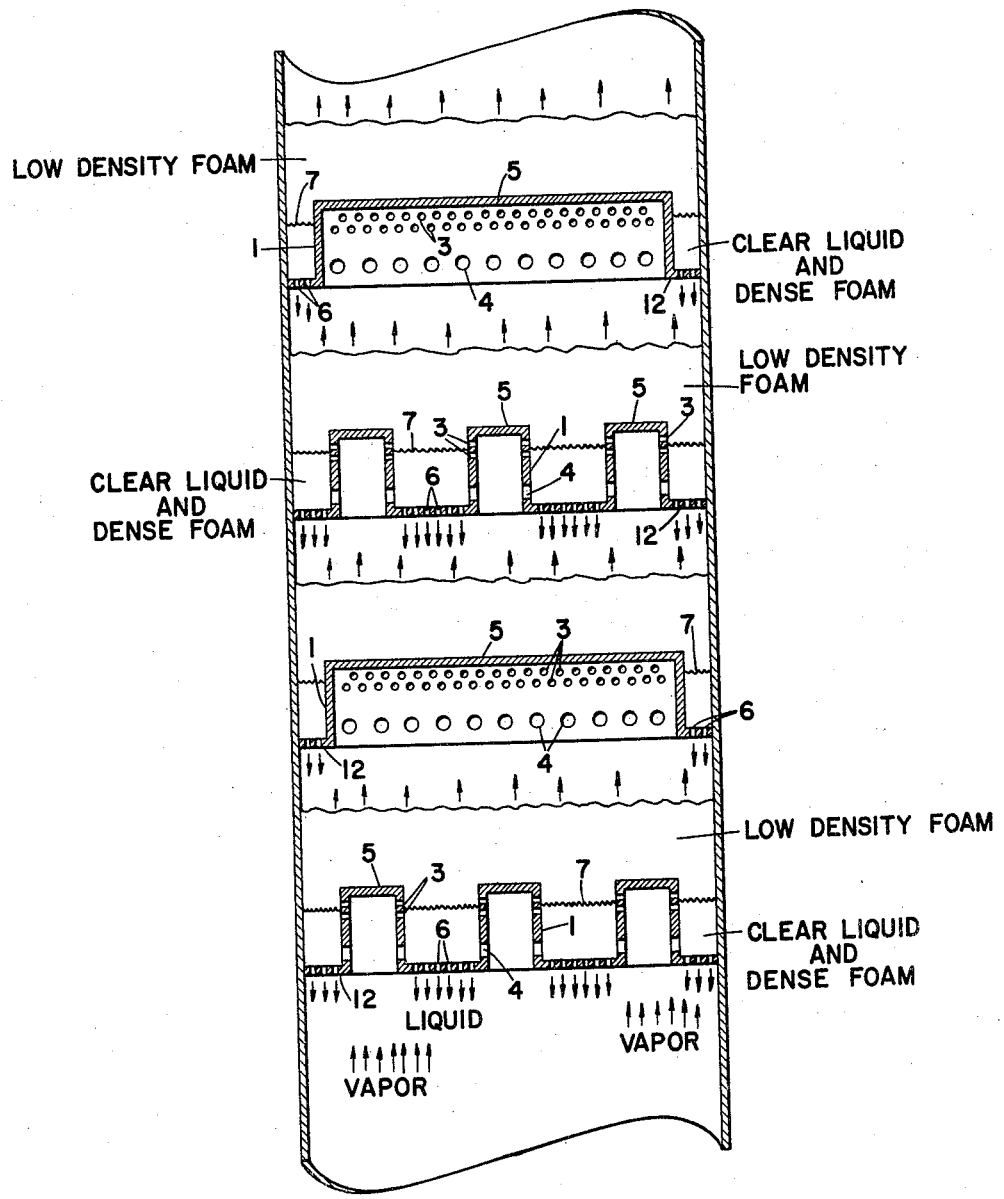
FIGURE 1 is a vertical section through a fractionating column.

In accordance with the present invention, there is illustrated a fractionating column which is provided with a plurality of spaced fractionating plates or decks 12 for the collection of downflowing liquid thereon so that establishment of the appropriate equilibrium conditions between the rising vapors and the liquid can be approached.

For efficiency in fractionation of a mixture it is necessary that an intimate mixing of the vapors with the liquid trapped on each plate be obtained. It is the intimacy of contact of the rising vapors with the downflowing liquid that determines the degree of fractionation accomplished. The improved contact device of the present invention provides this.

In accordance with the present invention, a plurality of uptake conduits or chimneys 1 are arranged on tray 12. These conduits, which are preferably manufactured from standardized trough units, are box shaped. The chimneys 1, which may be, in one embodiment, 2 inches to 6 inches in height, preferably 4 inches, are provided with two levels of a plurality of apertures, such as holes, one level 3 near the top and the second 4 at or near the base. The tops 5 of the chimneys 1 are imperforate. The holes 3 near the upper level are small, of the order of 1/8 inch in diameter. The lower level of holes 4 may be somewhat larger, of about 1/4 to 1 inch diameter. The imperforate spacing between the two levels represents about 50 to 90% of the total length of the chimney. The ratio of the vapor aperture area in the top of the chimneys 1 to the liquid aperture area in the tray proper 12 may be .5 to 2.

The self-refluxing fractionation tray is made up of a series of standardized shop-fabricated trough units. These units are made of thin sheets of metallic material chosen to resist anticipated service corrosion conditions. The trough units are fabricated in a series of operations requiring punching and bending equipment. The punching operation may be performed on a single sheet or on multiple sheets to reduce operating and handling time. Following the punching of holes or slots, the sheet is bent to the trough shaped configuration. These units, after the installation of stiffeners, may then be shipped directly to the field for storage and/or assembly into the tray proper or cut and assembled in the shop for further cost reduction.

Besides the standard trough units, thin sheets of metal bent to the required shape are supplied to close off the chimneys at the ends of each assembly. These pieces are bent from the same material as the trough units. The stiffeners for standard trough units, in one of several possible configurations, are made up of metal threaded rods which would be attached to the units prior to shipment and/or assembly.

The final assembly of the trough units and end closure pieces in a fractionation column requires only one additional piece of equipment, a support device around the periphery of the column. The trough units are then attached to this device by bolts or other suitable fasteners and the end closure pieces pressed into the proper locations. The peripheral system of support and the assembly of trough sections by connection at the top of the chimneys tend to minimize leakage from the tray.

The desirability of the trough configuration over conventional caps is based upon fabrication and installation economy. The multiplicity of machine shop or foundry operations required for the construction of circular perforated or serrated caps is economically unfeasible when compared to the simple multiple punching and bending operations required for trough construction. Also, the complicated installation of individual caps on a tray deck is time-consuming and costly when compared with the rapid, positive assembly of preformed trough sections. Therefore, it is anticipated that the trough type tray would reflect at least a fifty percent savings in over-all fabrications and installation cost over circular cap trays of any type.

The fractionation of this tray is marked by its simplicity in use of standardized trough units. The stiffening studs 14 or equivalents may be shop installed. The trays can be preassembled with the standard units and cut to conform to any given diameter in the shop, thus minimizing the requirement for field cutting and fitting. The tray and its individual elements are essentially self-supporting even when fabricated of thin gauge metal because of the inherent strength of the box shape. This fact reduces the complexity of tower internals and further reduces fabrication and maintenance costs. Installation is simplified by the tray being assembled entirely from the top. Bolt heads may be welded to the underside of the support ring 15, thus allowing top assembly. Likewise, bolting of top sections and end closures may be accomplished from above. The lack of necessity of downcomers also contributes to mechanical simplicity and cost reduction while concomitantly providing increased effective tower cross-sectional area. The standard trough section also facilitates tower inspections since tray segments can be removed as desired without appreciably affecting the strength of the remainder of the tray.

In operation, vapor passes through the upper level of holes into the foaming region of tray 12. This foaming region normally extends from just above the tray to 12 to 26 inches above the tray floor and represents the zone wherein entrained recycle liquid is disengaged from the uprising vapor stream. The clear liquid level on tray 12 is maintained slightly above the row of holes 4 in conduit 1.

Because of the lower back pressure due to lower static head, the rising vapors passing through cap 1 preferentially pass through the upper level of holes 3. Liquid trapped on the surface of tray 12 flows into the lower level 4 of chimney 1, and a substantial portion is immediately entrained by the rising vapor stream. On entrainment, the liquid is impacted with great force on the imperforate top 5 of chimney 1 and is atomized into exceedingly fine droplets.

As the vapors and atomized liquid droplets pass out through holes 3 they pass into the foam or disengaging space, coming into most intimate contact with that phase.

The maintenance of a frothing region above the liquid level on the tray is an important element in the process of the present invention. It is there that the finely dispersed liquid is disengaged from the vapor so that entrainment to the tray above is minimized. This frothing region also effects additional contacting over and above that obtained in the cap. The density of the foam may be of the order of one-tenth to eight-tenths of the quiescent liquid beneath. Hence there is little back pressure for the vapor to overcome in passing through the tray.

Because of the greater static head on the lower row 4 of perforations in chimney 1, liquid preferentially passes through this level of holes. This liquid is ejected horizontally into the high velocity rising vapor stream. Some of this liquid is therefore entrained by the vapor and is then returned to the tray. The contact of the rising vapor with the descending liquid and entrained liquid thus causes the entire volume of the tower to take part as effective fractionating volume. There is thus established a continuous liquid recycle on the tray, the amount and extent of which can be controlled by the number, size and shape of the apertures in the cap, the number, size and shape of the caps, and the elevation of the holes. The distance between the holes or slots where rising vapor passes through on its upward path and the lower holes which pass liquid is preferably such to allow liquid head to be somewhat higher than pressure drop through the vapor circuit.

Figure 2:
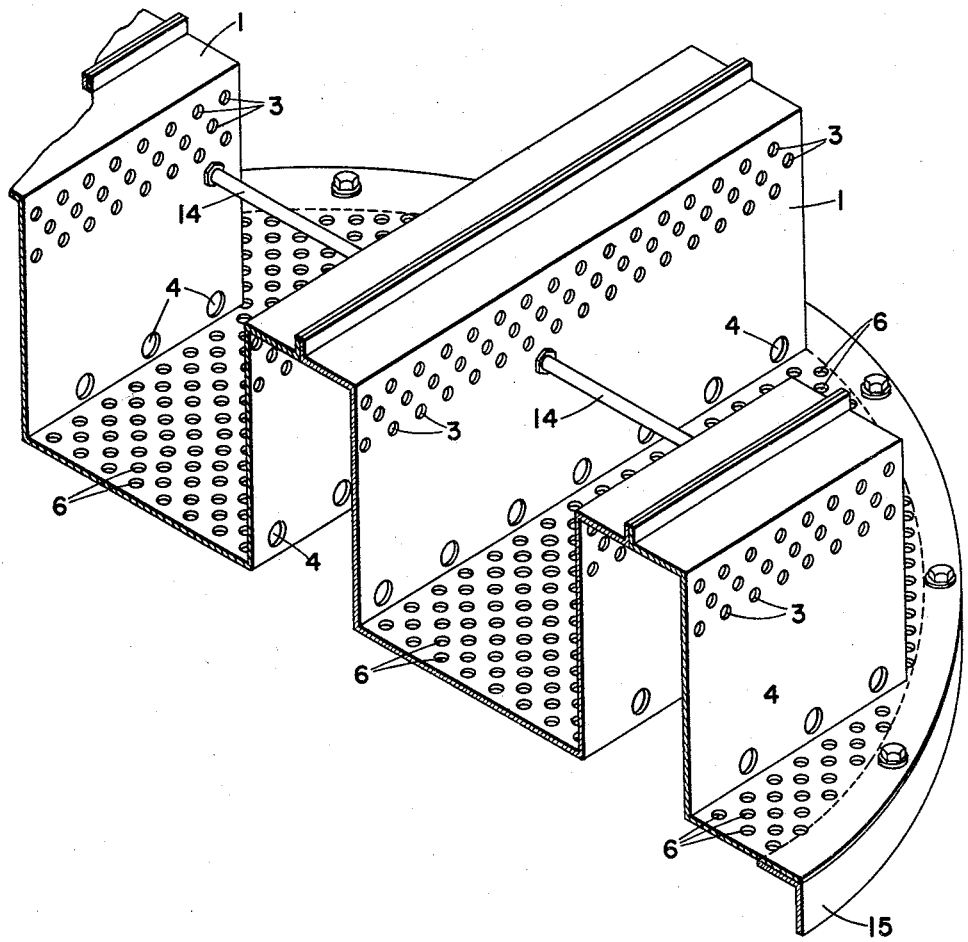
FIGURE 2 is an isometric view of the tray of the present invention.

The maintenance of the critically important frothing region for the design depicted in FIGURES 1 and 2 is effected by the design pressure balance of the tray. The vapor pressure drop through the tray is dependent principally on the size and number of holes 3 and the size and number of chimney 1. In one embodiment, the distance of the lowest level of holes 3 is 3 inches above the tray proper 12. Of the total pressure drop, the pressure drop of vapor through the tray due to the constriction of holes 3 and chimney 1 is two inches of water column. This vapor pressure drop must be compensated by the pressure exerted by the froth and clear liquid resident on the tray proper 12 but beneath the holes 3. Assuming a froth depth of 2 inches and specific gravity of 0.75, the clear liquid column required to compensate the vapor pressure drop would be one-half inch of water column. The height of the clear liquid column must be further increased to a height equivalent to the pressure drop required to force liquid through the tray proper 12. This pressure drop is equivalent to one-half inch of water column. Therefore, the total height of clear liquid standing on the tray proper 12 is one inch of water column. In addition, there are 20 inches of froth of 0.2 specific gravity equivalent to 4 inches of water column resident above the lowest level of holes 3 into which vapor is injected to develop the frothing level. Vapor leaving the holes 3 must pass through this low density froth region. Therefore, the total vapor circuit tray pressure drop is 6 inches of water column.

The size of the chimney 1 is such that the vapor carries the entrained liquid upward with sufficient force to atomize it by almost explosive impact against the top 5 of the caps and return it to the vapor or foam space above the tray for further vapor contact. Additional liquid is also entrained by the sweeping action of the vapor in its passage up the tower. The source of this liquid is the liquid flowing downward from holes 6 in the tray proper. Thus as the liquid passes downward from the tray above, it contacts vapor in the foam space and settles on the tray 12. Liquid level is maintained on the tray due to pressure drop of vapor passage, and it is from this reservoir that liquid is supplied to recycle holes 4 in the chimney 1.

The main body of the liquid reservoir, after having been fully contacted with vapor in the froth region, now passes through the holes 6 in the tray. Of course, some part of this liquid has also been recycled and superfractionated in the chimney 1, which, in this sense, acts as a very efficient contacting chamber. The liquid now proceeds, well distributed throughout the cross-section of the tower, to the tray below and enters into its frothing region. The holes 6, in the perforate tray proper, may be ⅛ inch diameter to 2 inches diameter and may assume shapes other than circular holes.

In operating with the tray of the present invention, two major advantages are realized over operating with trays presently available, namely a better hydraulic performance and better contacting of vapor with liquid. Superior hydraulic performance is realized by the fact that the liquid and vapor paths have been optimized in such a manner as to avoid loss in contacting. Since there is now, for the most part, a quiescent settling zone on the bottom of the tray through which no vapor bubbles, a clear disengaged liquid level is established. This greatly helps as a driving force for the liquid since the density of this liquid is at least three times that of the foam found on sieve and other perforated type trays. The vapors do not have any greater back pressure to offset than they would in a conventional sieve tray.

The better contacting is obtained by the highly turbulent mixing and contacting that takes place in the chimney 1. Here liquid is entrained since the cap velocity is five to ten times normal tower vapor velocity. At this high chimney vapor velocity, the entrained liquid is smashed against the top of the cap 5 with almost explosive violence. Then, after the slug of liquid has been atomized in this manner, it leaves the chimney 1 together with the vapor by "squeezing through" ⅛ inch diameter holes 3. Normal bubbling contact (as in conventional trays) then occurs in the froth region. Hence, all contacting in the chimney 1 is in addition to the bubbling contact in the froth.

In effect, an improvement in all three of the major design criteria of a good fractionating device is obtained by the present invention with no attending disadvantages. There are increased capacity, lower pressure drop and better fractionation. An improvement in vapor handling capacity of about 50 to 100% over conventional trays, i.e. bubble cap, sieve, etc., has been realized at constant liquid loadings. Conversely at constant vapor loadings, liquid loadings can be increased from 2,500 gal./hr./sq. ft., a limiting condition for most trays, to 5,000 gal./hr./sq. ft.

It has been experimentally determined that the tray pressure drop at these increased loadings is actually only about one-fourth the tray pressure drop for conventional trays.

Although the finely atomized liquid in mixture with the gas would normally present a serious problem as regards entrainment to the tray above, by the maintenance of the frothing region this liquid is disengaged and returned to the tray proper 12. The froth region is maintained by a hydraulic balance whereby the normal liquid-dense froth level 7 is slightly below the lowest of the vapor outlet holes 3.

The minimum limit for good operating conditions occurs when insufficient equivalent liquid head is available to prevent vapor bypassing through holes 6 on the tray proper 12. The maximum limit occurs when the top of the froth region approaches the tray above. The ratio of this maximum limit to the minimum limit determines the tray flexibility. In instances where very wide flexibility is necessary, the lowest level of the vapor holes 3 may be lowered to permit frothing at lower loadings. Other apertures, such as slots of various shapes, may be used for the same purpose.

Conventional downcomerless trays have experienced difficulty with flexibility because of the difficulties in making accurate calculations and designs for the random type liquid and vapor flow and because of the inherently narrow band of stable tray operation.

The present invention may be adapted to all types of fractionating towers. In existing towers its use increases capacity and operational stability, and in new designs its use will permit a more economical size relationship between tray and tower volume. Thus because of the higher vapor velocity and more intimate mixing, a column of small diameter may be employed.

What is claimed is:

1. In a fluid contacting apparatus, a tower having vertically spaced, transverse, downcomerless, perforated trays, said trays having chimneys disposed thereon, said chimneys extending upwardly through said tray and longitudinally across said tray, said chimneys being disposed substantially parallel one to another on said tray, each of said chimneys having two lateral surfaces, an imperforate top surface and two imperforate end surfaces, said lateral surfaces meeting said top surface substantially at right angles, each of said lateral surfaces having an upper series and lower series of substantially circular apertures therethrough, said upper series being substantially parallel to said lower series, the spacing between said upper and said lower series being 50 to 90% of the total height of said chimney above said tray, said apertures in said upper series being substantially smaller than said apertures in said lower series, means for passing a vapor stream upwardly to said trays and through said upper series of apertures in said chimneys, means for maintaining a liquid level on said tray at a predetermined level, said lower series of apertures being below said liquid level.

2. In a fluid contacting apparatus, a tower having vertically spaced, transverse, downcomerless, perforated trays, each of said trays having at least one chimney disposed thereon, said chimney extending upwardly through said tray and longitudinally across said tray, said chimney having two lateral surfaces, an imperforate top surface and two imperforate end surfaces, said lateral surfaces meeting said top surface substantially at right angles, each of said lateral surfaces having an upper series and lower series of substantially circular apertures therethrough, said upper series being substantially parallel to said lower series, the distance between said upper and said lower series being 50 to 90% of the total height of said chimney above said tray, said apertures in said upper series being substantially smaller than said apertures in said lower series, means for passing a vapor stream upwardly to said tray and through said upper series of apertures in said chimney, means for maintaining a liquid level on said tray at a predetermined level, said lower series of apertures being below said liquid level.

References Cited in the file of this patent

UNITED STATES PATENTS

| | | |
|---|---|---|
| 816,267 | Steel | Mar. 27, 1906 |
| 1,904,380 | Morrell et al. | Apr. 18, 1933 |
| 2,523,126 | Long | Sept. 19, 1950 |
| 2,767,967 | Hutchinson | Oct. 23, 1956 |
| 2,803,528 | Erdmann | Aug. 20, 1957 |